(12) United States Patent
Goble et al.

(10) Patent No.: US 9,689,957 B2
(45) Date of Patent: Jun. 27, 2017

(54) SOLAR TRACKING SYSTEM USING PERIODIC SCAN PATTERNS WITH A SHIELDING TUBE

(71) Applicant: SolarCity Corporation, San Mateo, CA (US)

(72) Inventors: Jos C. Goble, Mountain View, CA (US); Salomon J. Trujillo, Redwood City, CA (US); Benjamin D. Sumers, Los Altos Hills, CA (US); Christopher O. Perkins, Cupertino, CA (US)

(73) Assignee: SolarCity Corporation, San Mateo, CA (US)

( * ) Notice: Subject to any disclaimer, the term of this patent is extended or adjusted under 35 U.S.C. 154(b) by 216 days.

(21) Appl. No.: 14/506,526

(22) Filed: Oct. 3, 2014

(65) Prior Publication Data

US 2015/0260825 A1    Sep. 17, 2015

Related U.S. Application Data

(63) Continuation-in-part of application No. 13/506,998, filed on May 29, 2012, now Pat. No. 8,878,113.

(51) Int. Cl.
| | |
|---|---|
| *G01S 3/782* | (2006.01) |
| *G01S 3/786* | (2006.01) |
| *G01S 3/781* | (2006.01) |
| *G01J 1/02* | (2006.01) |
| *G01J 1/04* | (2006.01) |
| *G01J 1/42* | (2006.01) |

(52) U.S. Cl.
CPC ........... *G01S 3/7861* (2013.01); *G01J 1/0266* (2013.01); *G01J 1/0271* (2013.01); *G01J 1/0411* (2013.01); *G01J 1/0418* (2013.01); *G01J 1/42* (2013.01); *G01S 3/781* (2013.01); *G01J 2001/4266* (2013.01)

(58) Field of Classification Search
CPC ......... G01S 3/782; G01S 3/786; G01S 3/7861
USPC ........ 250/203.1, 203.3, 203.4; 136/246, 248, 136/252; 126/572, 573, 576, 600, 698
See application file for complete search history.

(56) References Cited

U.S. PATENT DOCUMENTS

| | | |
|---|---|---|
| 3,227,929 A | 1/1966 | McCreight |
| 3,780,966 A | 12/1973 | Newcomb, Jr. et al. |
| 3,996,460 A | 12/1976 | Smith |
| 4,041,307 A | 8/1977 | Napoli et al. |

(Continued)

FOREIGN PATENT DOCUMENTS

CN    101873091 A    7/2010

*Primary Examiner* — Kevin Pyo
(74) *Attorney, Agent, or Firm* — Kilpatrick Townsend & Stockton LLP

(57) ABSTRACT

A solar tracking system and method that use a tube that admits solar radiation and one or more photodetectors for generating a signal related to an intensity of solar radiation at a distal end of the tube. The system has a scan unit for periodically executing a certain scan pattern in an elevation angle El and in an azimuth angle Az of the shielding tube. A processing unit in communication with the photodetector determines an on-sun orientation of the shielding tube based on a convolution of the signal obtained while executing the scan pattern with a trained convolution kernel. The on-sun orientation thus found can be used to update the orientation of one or more solar surfaces, e.g., reflective or photovoltaic surfaces.

22 Claims, 7 Drawing Sheets

(56) References Cited

U.S. PATENT DOCUMENTS

| | | | |
|---|---|---|---|
| 4,090,070 | A | 5/1978 | Colomes |
| 4,179,612 | A | 12/1979 | Smith |
| 4,225,781 | A | 9/1980 | Hammons |
| 4,290,411 | A | 9/1981 | Russell |
| 4,404,465 | A | 9/1983 | Miller |
| 4,484,565 | A | 11/1984 | Mori |
| 4,495,408 | A | 1/1985 | Mori |
| 4,513,087 | A | 4/1985 | Giulani et al. |
| 5,052,804 | A | 10/1991 | Martin |
| 5,851,309 | A | 12/1998 | Kousa |
| 7,240,675 | B2 * | 7/2007 | Eickhoff ............... F24J 2/055 126/652 |
| 7,507,941 | B2 | 3/2009 | Yeh et al. |
| 8,104,893 | B2 | 1/2012 | Reznik et al. |
| 8,115,151 | B2 | 2/2012 | Wang |
| 8,481,906 | B2 | 7/2013 | Sobolewski et al. |
| 2008/0017784 | A1 | 1/2008 | Hoot et al. |
| 2010/0095954 | A1 | 4/2010 | Huang et al. |
| 2011/0000478 | A1 | 1/2011 | Reznik |
| 2013/0319501 | A1 | 12/2013 | Hilliard |

\* cited by examiner

SOLAR TRACKING SYSTEM USING PERIODIC SCAN PATTERNS WITH A SHIELDING TUBE

RELATED APPLICATIONS

This application is a Continuation-in-Part of U.S. patent application Ser. No. 13/506,998 by Jos C. Goble et al., filed on May 29, 2012 and incorporated herein in its entirety.

FIELD OF THE INVENTION

This invention relates generally to solar tracking systems and methods for ensuring on-sun orientation of a solar surface, and more precisely to systems deploying shielding tubes and periodic scan patterns to determine on-sun orientation.

BACKGROUND ART

Energy derived directly from solar radiation promises to address a number of challenges that humanity is facing. Still, a number of obstacles are preventing more widespread adoption of solar systems. One of these challenges relates to efficient tracking of the sun as it traverses its daily trajectory in the sky.

Solar tracking is needed to obtain maximum insolation of a solar surface or to maintain an intended angle of incidence of solar radiation onto the solar surface. The exact sun tracking tolerances depend on whether the solar surface is a reflecting surface used for sunlight concentration purposes or a photovoltaic surface (PV) that converts sunlight into electrical energy.

There are many types of sunlight trackers taught in the prior art. Typically, these systems have one or more photosensors that are mounted in such a manner that the amount of sunlight incident on them varies with its angle of incidence. In particular, U.S. Pat. No. 4,290,411 to Russell teaches a solar energy collector and sun-tracking apparatus that uses photoelectric cells buried in shield tubes to shield them from stray light. The control of the system is responsive to direct rays that are detected by the photoelectric cells.

Many other prior art teachings also address shielding mechanisms to ensure that photosensors are responsive only to direct rays of the sun to make tracking more effective. Thus, another exemplary mechanism involves light tunnel devices from a common single-point micro-hole that acts as input power for directional light, as taught in U.S. Pat. No. 8,115,151 to Wang. In the light tracking sensor and sunlight tracking system described by Wang, the other ends of the light tunnel devices act as output ports for directional light and are provided with light-sensing units.

In fact, tubes, tunnels, barrels and other shielding devices with and without optics (e.g., lenses) have also been described in conjunction with solar tracking and the tracking of light sources in general by many other references. For a more comprehensive overview of the state of the art the reader is referred to the following exemplary references: U.S. Pat. No. 3,227,929 to McCreight, U.S. Pat. No. 3,780,966 to Newcomb, U.S. Pat. No. 4,041,307 to Napoli et al., U.S. Pat. No. 4,404,465 to Miller, U.S. Pat. No. 4,484,565 to Mori, U.S. Pat. No. 8,104,893 to Reznik, U.S. Published Appl. No. 2010/0095954 to Huang et al, U.S. Pat. No. 5,851,309 to Kousa and U.S. Pat. No. 8,481,906 to Sobolewski et al.

A shortcoming of the prior art teachings has to do with the efficiency of tracking when performing only periodic updates in on-sun orientation. For example, most systems are not designed to address longer time periods between updates and many track continuously. While appropriate for some applications, these approaches are not compatible with low-cost solar tracking systems that are updated on a periodic basis with minimal resources on the structure bearing the solar surface.

OBJECTS OF THE INVENTION

In view of the shortcomings of the prior art, it is an object of the present invention to provide low-cost solar tracking apparatus and methods that support periodic updates of on-sun orientation with minimal resources on the mechanical structure bearing a solar surface.

SUMMARY OF THE INVENTION

The objects and advantages of the invention are secured by a solar tracking system that uses a tube that admits solar radiation through an opening at one end, and has one or more photodetectors for generating a signal related to an intensity of solar radiation at a distal end, which is the other end of the tube, i.e., not the end that admits the solar radiation. Furthermore, the system has a scan unit for periodically executing a certain scan pattern of the tube.

A processing unit in communication with the one or more photodetectors determines an on-sun orientation of the tube based on the scan pattern performed by scan unit. The on-sun orientation thus found can be used to update the orientation of one or more solar surfaces, e.g., reflective or photovoltaic surfaces.

Preferably, the tube is a shielding tube that has an absorptive inner surface for absorbing the solar radiation that is incident on it. Preferably, the scan unit executes the scan pattern in an elevation angle El and in an azimuth angle Az of the tube. Preferably, the processing unit determines the on-sun orientation of the tube based on convolution of the signal obtained while executing the scan pattern with a trained convolution kernel.

Preferably, the shielding tube is attached to a solar surface or a collection of such surfaces to move together with them. The attachment is performed in such a way that a surface normal (normal vector n̂) to the solar surface or surfaces is aligned parallel with a center axis of the tube.

The scan unit has an elevation drive for varying the elevation angle El and an azimuth drive for varying the azimuth angle Az. It is convenient to use the same scan unit for adjusting or updating the orientation of the one or more solar surfaces as well as for executing the scan pattern. Thus, for example, the solar tracking system can further include a support structure for the solar surface(s). The elevation and azimuth drives can be integrated with that support structure to update the orientation of the solar surface(s) based on the on-sun orientation found with the aid of the scan pattern executed by the tube.

Preferably, the solar tracking system is equipped with a light guide, such as an optical fiber, for guiding the solar radiation from the distal end of the tube to the one or more photodetectors. This is convenient when the photodetector(s) are remote from the shielding tube. For example, such remote photodetector(s) can be housed on-board a mobile robot that establishes a temporary connection with the light guide.

Furthermore, the mobile robot preferably also houses the processing unit and it has a mechanism for interfacing with the scan unit. It can thus track the values of the elevation angle El and azimuth angle Az and follow the scan pattern being executed.

The system can provide an additional optic, e.g., a lens at the distal end of the tube, for coupling the solar radiation into the light guide. Any suitable refractive, diffusive, or other type of optic may be deployed for this purpose.

The solar tracking system can take into account the prevailing or ambient insolation conditions by using an appropriate meter. A communication link between the meter and the processing unit is provided in those cases for supplying the measure to the processing unit. Thus, the processing unit is in a position to adjust its determination of the on-sun orientation based on the ambient insolation conditions. In embodiments where the scan pattern uses convolution of the signal obtained during the scan pattern with a trained convolution kernel, the scan pattern can further correct the trained convolution kernel based on the ambient insolation conditions.

The invention further extends to methods for solar tracking that provide a shielding tube for admitting solar radiation into it. An absorptive inner surface is provided in the shielding tube for absorbing the solar radiation that is incident on its inner surface. The method calls for generating a signal related to an intensity of the solar radiation at the distal end of the shielding tube.

The method further involves periodically executing a certain scan pattern of the shielding tube. In another step, determination of an on-sun orientation of the shielding tube is achieved by the processing unit based on the signal obtained during the execution of the certain scan pattern. According to the method, the orientation of at least one solar surface is updated based on the on-sun orientation of the shielding tube.

Preferably, the scan pattern of the shielding tube is executed by the scan unit in an elevation angle El and in an azimuth angle Az of the shielding tube. Preferably, the processing unit determines the on-sun orientation of the shielding tube by convolving the signal obtained during the known scan pattern with a trained convolution kernel.

The step of periodically executing the scan pattern is preferably repeated within a certain period of time that is approximately 40 minutes. Preferably, the solar radiation is not directly detected at the distal end of the shielding tube, but is instead transported from there to remote photodetector(s) using a light guide. Most preferably, the remote photodetecor(s) are housed on-board a mobile robot. A temporary connection is established periodically between the light guide at the mobile robot, e.g., approximately every 40 minutes, and the scan pattern is advantageously executed while the temporary connection is established.

The scan pattern itself involves a scan in the elevation angle El and a scan in the azimuth angle Az. Conveniently, these two scans are performed sequentially. For example, the scan in elevation angle El is performed first. Alternatively, the scan in azimuth angle Az is performed first. Other alternatives in which both elevation and azimuth angles El, Az are varied simultaneously can also be implemented.

In some embodiments, the trained convolution kernel starts with a square kernel function $g(\tau)$. This function is then adjusted based on the training. Of course, other functions that are sensitive to the signal's drop-offs from maxima can also be used for commencing the training. In addition, according to the method a measure of ambient insolation conditions can be obtained and the trained convolution kernel can be corrected based on that measure.

Clearly, the apparatus and methods of invention find many advantageous embodiments. The details of the invention, including its preferred embodiments, are presented in the below detailed description with reference to the appended drawing figures.

BRIEF DESCRIPTION OF THE DRAWING FIGURES

Figure 3A:
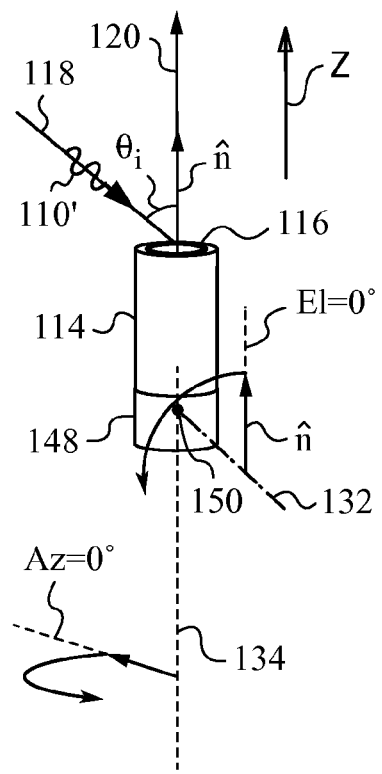
Figure 3B:
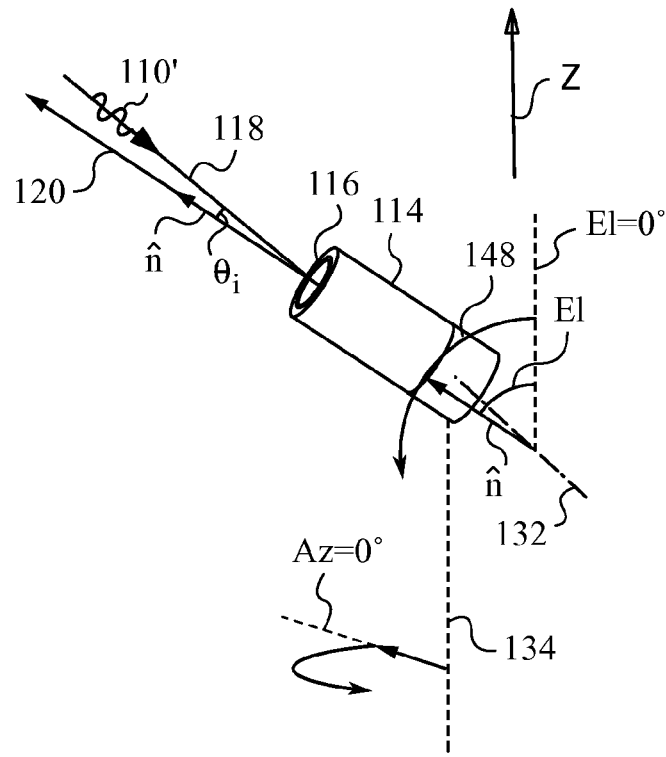
Figure 3C:
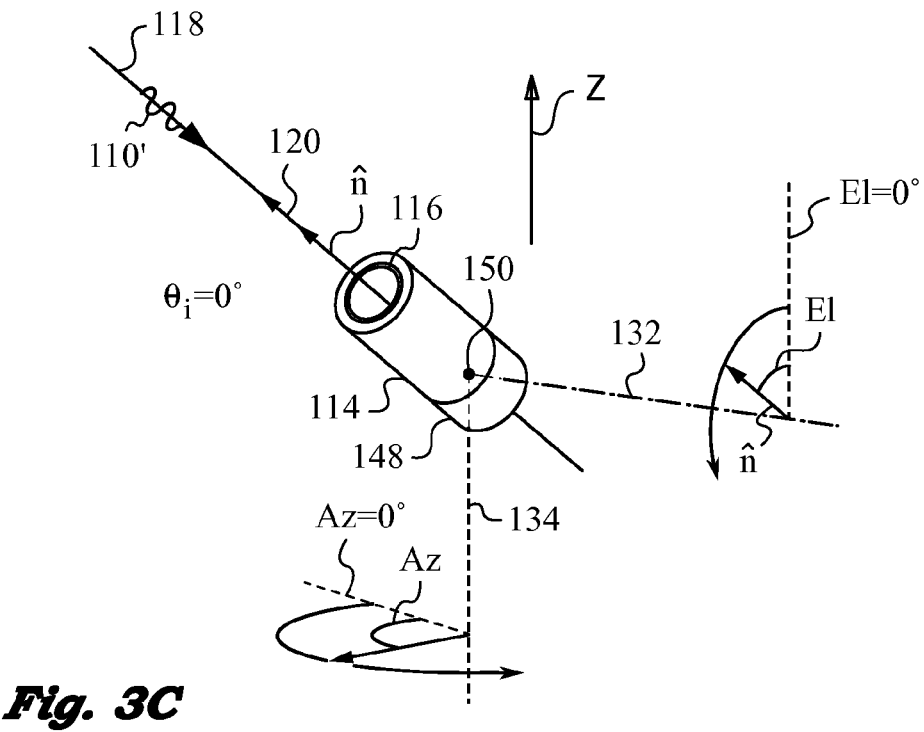

FIG. 3A-C are three dimensional isometric views of a tube being adjusted in the elevation angle El and azimuth angle Az.

Figure 4:
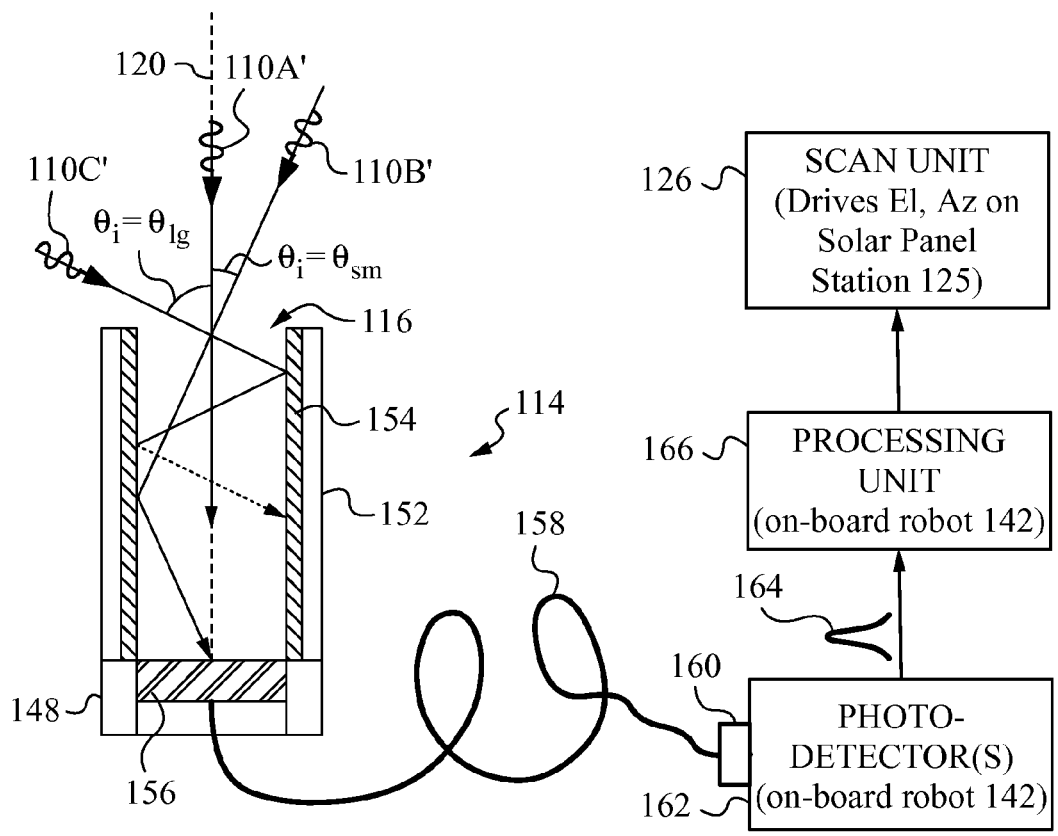

FIG. 4 is a diagram showing the operation of the shielding tube.

Figure 5:
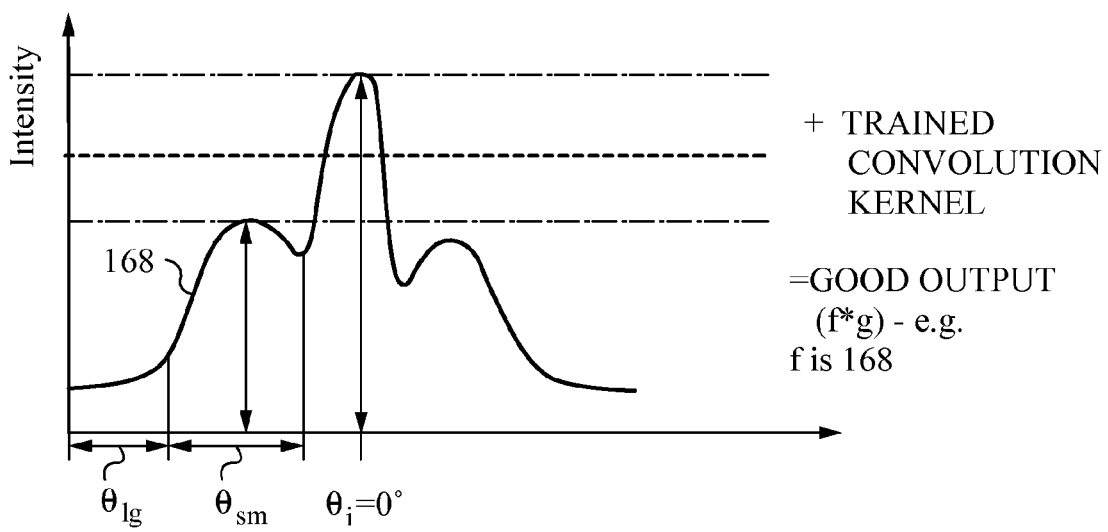

FIG. 5 is a graph of the intensity of solar radiation observed at a distal end of the shielding tube obtained during a scan.

Figure 6:
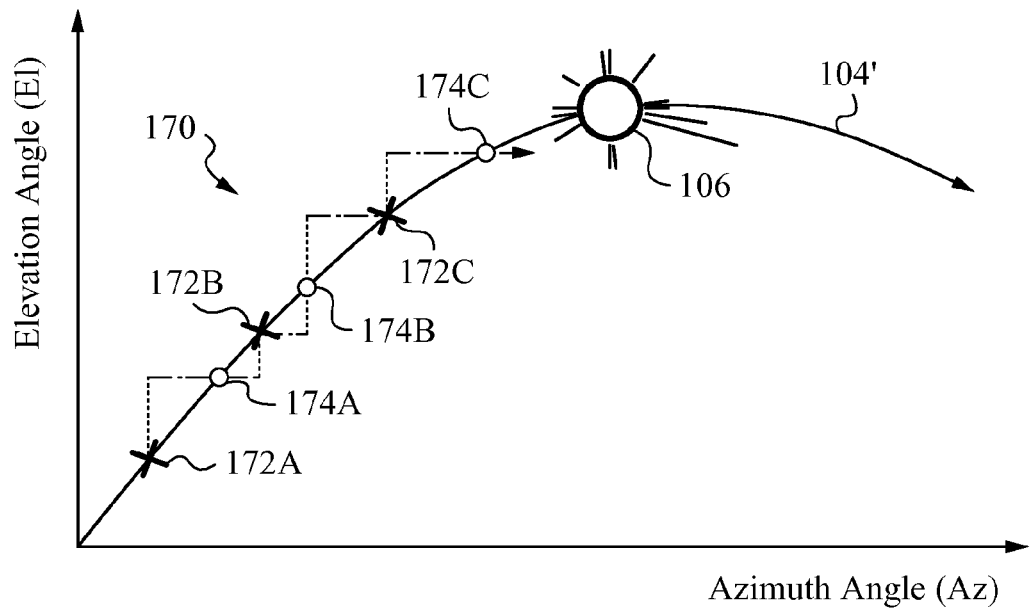

FIG. 6 is an illustrative graph showing a preferred scan pattern in elevation and azimuth angles El, Az.

Figure 7A:
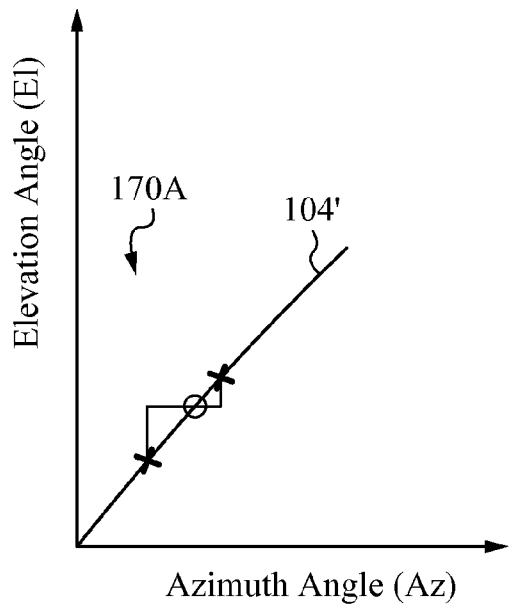
Figure 7B:
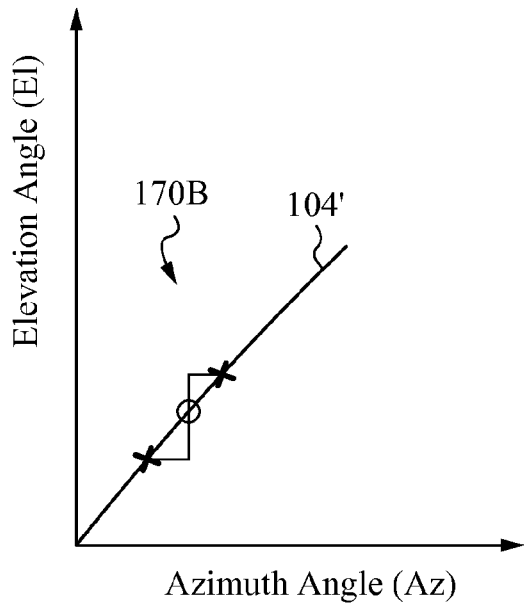

FIGS. 7A-B are graphs of alternative sequences starting with elevation angle El first or with azimuth angle Az first.

Figure 8:
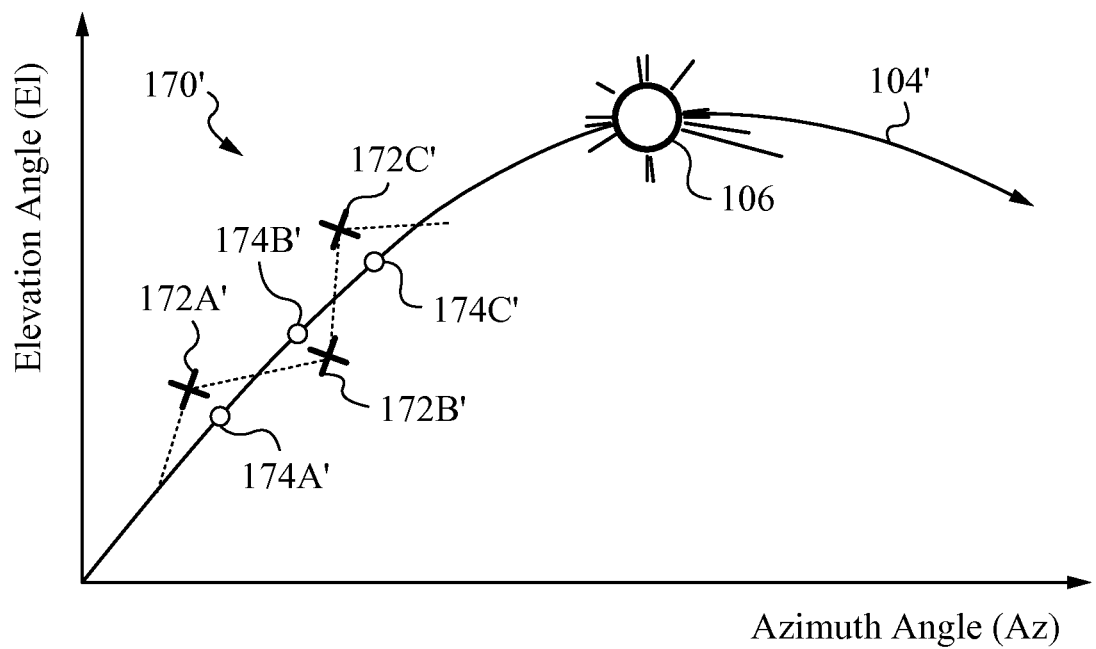

FIG. 8 is an illustrative graph showing another scan pattern according to the invention.

Figure 2:
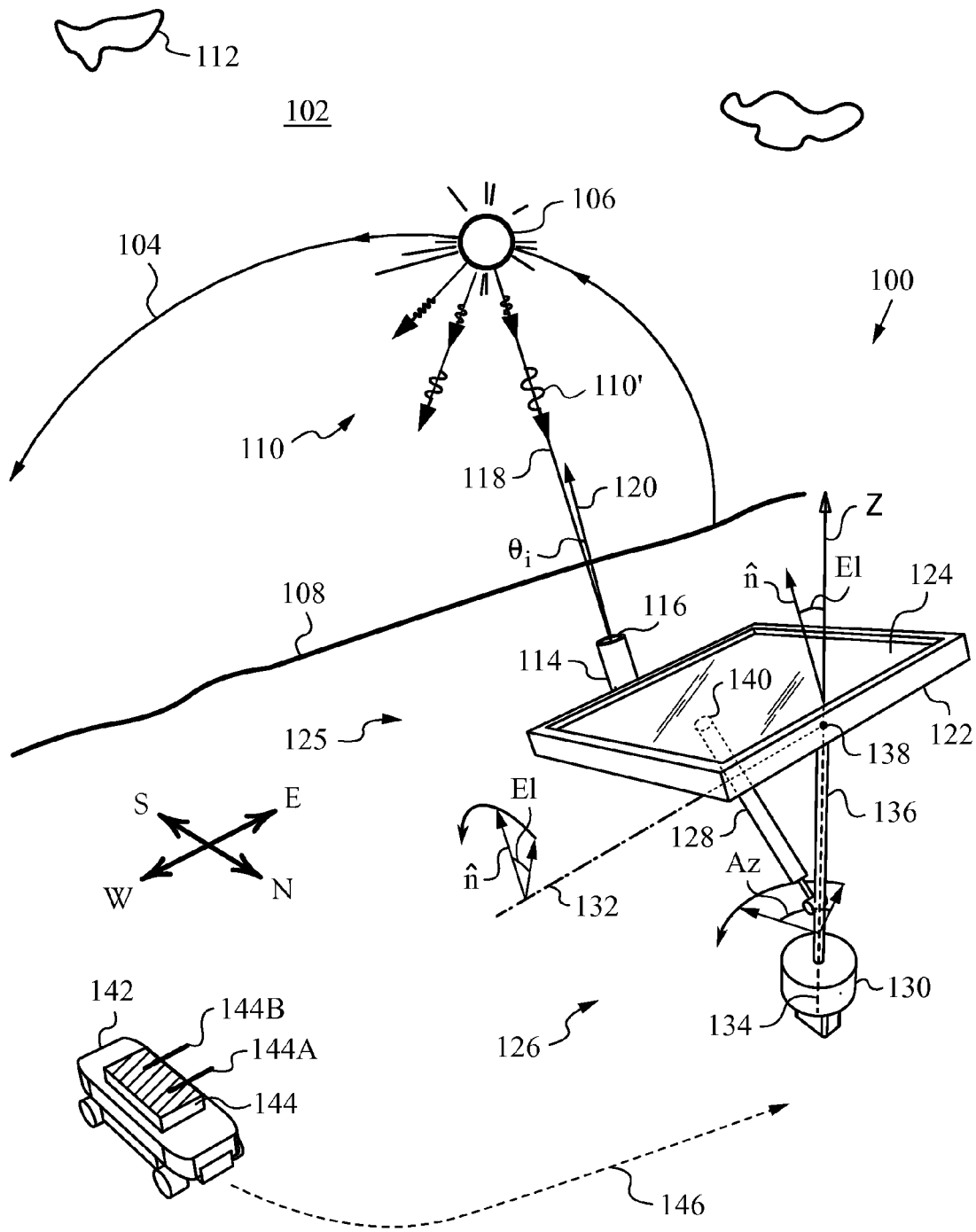
FIG. 2 is a three dimensional perspective view of an embodiment of the solar tracking system of the present invention that employs a mobile robot.
Figure 9:
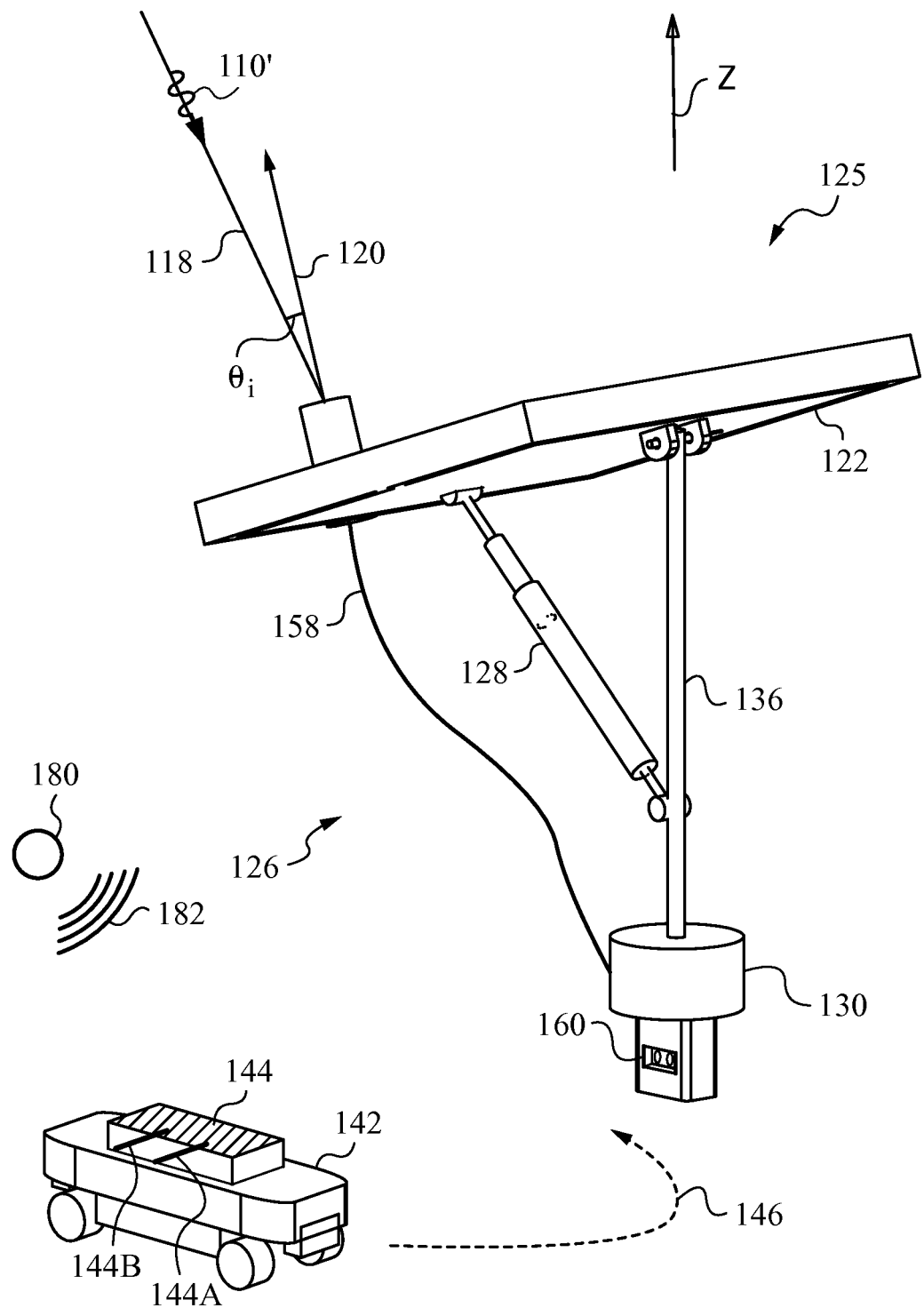

FIG. 9 is a three dimensional isometric view showing in more detail the solar panel station and mobile robot shown in FIG. 2.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
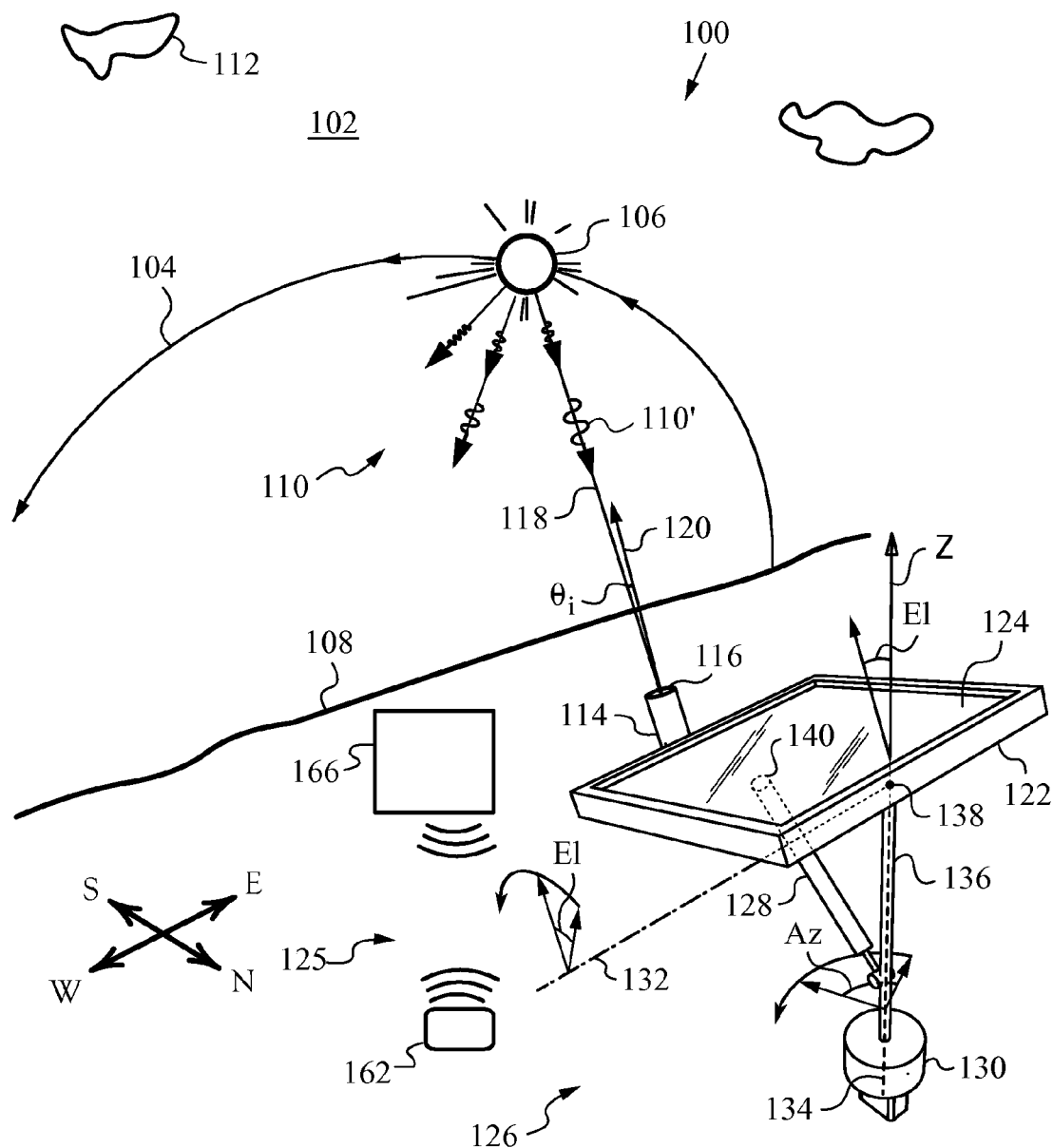
FIG. 1 is a three dimensional perspective view of a solar tracking system according to the invention.

The present invention will be best understood by first reviewing the three dimensional perspective view of a solar tracking system 100 illustrated in FIG. 1. Solar tracking system 100 is set up in a well insolated environment 102. A path or trajectory 104 of sun 106 in environment 102 from sunrise to sunset is indicated above horizon 108. At the instant captured in FIG. 1, the time is just before noon and sun 106 is approaching its zenith. The cardinal directions, West (W), East (E), South (S) and North (N) are explicitly drawn for establishing orientation in environment 102 and establishing trajectory 104 from sunrise in the East (E) to sunset in the West (W).

Solar radiation 110 emitted by sun 106 is indicated in general and also by individual photons 110'. Photons 110' represent electromagnetic radiation of varying wavelengths generally contained within a solar spectrum that can also be described by a bandwidth $\Delta\lambda_{amb}$. The spectral distribution of solar radiation 110 within bandwidth $\Delta\lambda_{amb}$ at the Earth's surface in environment 102 typically extends from ultraviolet to infrared. Of course, the exact spectrum and scattering condition of photons 110' at the surface, also referred to as insolation conditions, depend on prevailing atmospheric conditions in environment 102. The most important of these conditions is cloud cover 112. A person skilled in the art will be familiar with methods of measuring insolation conditions as well as their dependence on atmospheric conditions.

Solar tracking system 100 uses a tube 114 with an opening 116 at an end that is sun-ward or sun-facing. Opening 116 is oriented such that tube 114 admits solar radiation 110. In particular, photon 110' is shown propagating along a ray 118 into tube 114 through opening 116. More precisely, photon 110' propagating along ray 118 enters tube 114 at an angle of incidence $\theta_i$ with respect to a center axis 120 of tube 114. It should be noted that angle of incidence $\theta_i$ in three dimensions is defined in a plane containing both ray 118 and center axis 120.

In the preferred embodiment, tube 114 is attached to a mechanical structure 122 bearing a solar surface 124. Mechanical structure 122 is a frame that holds solar surface 124 of a solar panel station 125. Of course, more complex structures bearing more than one solar surface can also be used. Indeed, many types of mechanical structures can be deployed for orienting them and holding tube 114 so they move together and preserve the same orientation.

In the present embodiment, tube 114 is mechanically coupled to move with surface 124. The mechanical attachment to frame 122 is performed in such a way, that a surface normal to solar surface 124, indicated by vector n̂, is aligned parallel with center axis 120 of tube 114. Therefore, angle of incidence $\theta_i$ of photon 110' propagating along ray 118 is the same as its angle of incidence would be with respect to solar surface 124. This arrangement ensures that when center axis 120 of tube 114 is aligned with ray 118 extending from sun 106 to opening 116 and is thus on-sun, so is solar surface 124. In other words, ensuring normal incidence ($\theta_i=0°$) of solar radiation 110 on tube 114 ensures normal incidence of solar radiation 110 on solar surface 124.

Solar tracking system 100 has a scan unit 126 for periodically executing a certain scan pattern of tube 114. This scan pattern is preferably in an elevation angle El and in an azimuth angle Az of tube 114. Of course, since tube 114 and solar surface 124 are mechanically coupled as described, scan unit 126 contemporaneously varies the same angles for solar surface 124.

To execute the scan pattern, scan unit 126 has a separate elevation drive 128 for varying the elevation angle El and an azimuth drive 130 for varying the azimuth angle Az. A person skilled in the art will realize that a large number of suitable drive configurations are available for performing scans in elevation and azimuth angles El, Az. Some of these may involve a single integrated drive mechanism with separate actuation of variation to elevation and azimuth angles El, Az. It is understood that any suitable integrated single drives or separate drives can be deployed by scan unit 126.

In the exemplary embodiment of FIG. 1, drives 128 and 130 are configured to vary elevation and azimuth angles El, Az about rotation axes 132, 134, respectively. Rotation axis 134 is collinear with the Z-axis that is perpendicular to the Earth's surface at the location of system 100. Meanwhile, rotation axis 132 is parallel to the Earth's surface at the location of system 100. Thus, axes 132, 134 define rotations that are orthogonal to each other.

In the present embodiment, rotation axis 134 extends through a vertical rotation shaft 136 that supports one end of frame 122. When rotation about axis 134 by any value of azimuth angle Az is required, azimuth drive 130 simply rotates vertical rotation shaft 136 by that angle. The connection between shaft 136 and frame 122 is such, that the latter is also rotated by the corresponding value of azimuth angle Az. In accordance with the rotation convention chosen herein, a counter-clockwise rotation is associated with a positive value of azimuth angle Az, as additionally indicated by the circular arrow. Of course, other rotation conventions can be selected, e.g., clockwise conventions along with various referencing options, as will be understood by those skilled in the art.

Rotation axis 132 is perpendicular to rotation axis 134, as remarked above, and it passes through the latter at a point 138 located within frame 122. This is shown with the dashed extension of axis 132 through frame 122. Point 138 indicates the center of rotation for variations in both, azimuth angle Az and elevation angle El.

It should be remarked, that the method of attachment of vertical shaft 136 to frame 122 must enable movement of frame 122 in a fixed plane that contains vertical axis 136 and is orthogonal to rotation axis 132. Out of plane movement (tilt or roll) must not be enabled by the attachment between shaft 136 and frame 122.

Meanwhile, rotation about rotation axis 132 is provided by elevation drive 128. Drive 128 is attached to frame 122 at a point 140 on the underside of frame 122 and is indicated with a dashed marker. Note that point 140 can either reside in the fixed plane or in a plane that is plane-parallel with the fixed plane. Either of these mechanical choices will support the requisite rotation about axis 132. In fact, a person skilled in the art will recognize the great variety of choices available for implementing the engagement of drive 128 with frame 122 so as to permit for variation in elevation angle El.

As with azimuth angle Az, positive elevation angle El is defined in the counter-clockwise direction, as indicated by the circular arrow. Also note, that in the case of elevation angle El it is convenient to set reference angle El=0° when surface normal n̂ or center axis 120 of tube 114 is parallel with the Z-axis. This is the convention adopted in the present embodiment.

The solar tracking system of the present invention further comprises one or more photodetectors 162 as illustrated in FIG. 1. Photodetector(s) 162 produce a signal related to the intensity of solar radiation 110 incident on the distal end of tube 114. Those skilled in the art will be familiar with the operation of and engineering behind photodetectors. Typically, a photodetector will convert the light radiation incident on a photosensitive surface of the photodetector, into a corresponding electrical signal.

The solar tracking system of the present invention further comprises a processing unit 166, which is in communication with photodetector(s) 162. Based on the signal produced by photodetector(s) 162 during the scan pattern executed by scan unit 126 on tube 114 as explained above, processing unit 166 determines the on-sun orientation of tube 114.

A highly preferred embodiment of the current invention is shown in FIG. 2, which is a variation of the embodiment illustrated in FIG. 1 and explained above. In this preferred embodiment tube 114 is a shielding tube that has an absorptive inner surface for absorbing the solar radiation that is incident on the inner surface. Many such absorptive materials are available that will absorb a high fraction of incident light as will be known to skilled artisans. Solar tracking system 100 further employs a mobile robot 142 to communicate with shielding tube 114 and determine the amount of solar radiation 110 at a distal end of tube 114. For this purposes, mobile robot 142 has a docking interface 144 for establishing a temporary connection with solar panel station 125. The docking station on the side of solar panel station 125 is not explicitly shown in FIG. 2 and will be discussed in more detail in reference to FIG. 9.

Docking interface 144 has one specific mechanism 144A for interfacing with scan unit 126 and another mechanism 144B for establishing the temporary connection with tube 114. Robot's 142 interface with scan unit 126 enables it to track the values of the elevation angle El and azimuth angle Az. Therefore, it can follow any scan pattern being executed by drives 128, 130.

Robot's 142 temporary connection with tube 114 via mechanism 144B enables it to gain access to information about the intensity of solar radiation 110 in tube 114. More specifically, the temporary connection occurs at distal end of tube 114, away from opening 116 that admits solar radiation 110 into it. Thus, robot 142 gains access to information about the intensity of solar radiation at the distal end of tube 114.

To understand the operation of solar tracking system 100, we turn to FIGS. 3A-C. These drawings leave out solar panel station 125 and focus on tube 114 to illustrate how variations in elevation and azimuth angles El, Az affect the intensity of solar radiation 110 at its distal end 148. FIGS. 3A-C are three dimensional isometric views of shielding tube 114 being adjusted in the elevation angle El and azimuth angle Az starting from El=0° and Az=0°. Recall that at elevation angle El=0°, surface normal n̂ and Z-axis are parallel according to the rotation convention chosen herein.

In order to simplify the explanation, but without any loss in generality, rotation axes 132, 134 are taken to pass through a point 150 in distal end 148 of tube 114 in FIGS. 3A-C. To compute these rotations in the coordinate system of FIG. 2, a coordinate transformation can be performed using a displacement vector from rotation center 138 to the new rotation center now located at point 150. A person skilled in the art will be familiar with how to perform the proper coordinate transformations between these two coordinate systems.

FIG. 3A shows the initial orientation of tube 114 at El=0° and Az=0°, which is not on-sun. In this orientation, the angle of incidence $\theta_i$ that photon 110' propagating along ray 118 makes with center axis 120 (or, equivalently with surface normal n̂ of solar surface 124) is large. Because of this large angle of incidence $\theta_i$ and the fact that inner surface of tube 114 is absorptive, little solar radiation 110 arrives at distal end 148 of tube 114. Differently stated, the large angle of incidence $\theta_i$ ensures that solar radiation 110 entering tube 114 undergoes many reflections off the inner surface of tube 114. Because that surface absorbs electromagnetic radiation, most of solar radiation 110 entering at $\theta_i$ is absorbed before reaching distal end 148. Hence, the intensity of solar radiation 110 at distal end 148 is low in this orientation of tube 114 and given the present position of sun 106 (position of sun 106 is the same as in FIG. 2 for clarity of explanation).

In FIG. 3B the orientation of tube 114 has been changed with a rotation about axis 132 by a certain positive elevation angle El (counter-clockwise). This variation in elevation angle El is effectuated by elevation drive 128 (see FIG. 2). Of course, to determine the necessary mechanical rotation applied by drive 128 in FIG. 2 to achieve the equivalent rotation shown in FIG. 3B, a coordinate transformation needs to be performed, as mentioned above. Notice that the same change in elevation angle El rotates surface normal n̂ by the value of elevation angle El with respect to the Z-axis. The change in elevation angle El is designed to get center axis 120 closer in orientation to ray 118. In other words, the change in elevation angle El is indented to get closer to on-sun orientation of center axis 120 of tube 114, or equivalently of surface normal n̂.

After rotation by elevation angle El, angle of incidence $\theta_i$ is reduced. Note that angle of incidence $\theta_i$ is still defined in the plane containing center axis 120 and ray 118. At the new angle of incidence $\theta_i$, more solar radiation 110 reaches distal end 148 of tube 114. That is because photons 110' entering through opening 116 at a smaller angle to center axis 120 undergo fewer reflections off the absorptive inner surface of tube 114. Hence, less solar radiation 110 is absorbed by inner surface of tube 114 and the intensity of solar radiation 110 at distal end 148 increases correspondingly.

FIG. 3C illustrates rotation about axis 134 by a positive azimuth angle Az. This rotation is performed by drive 130 (see FIG. 2). Once again, a coordinate transformation should be performed to express the rotation in the coordinate system of FIG. 2 where the center of rotation is at point 138, rather than at point 150. As in the case of rotation by elevation angle El, where it is convenient to chose El=0° when center axis 120 or surface normal n̂ is aligned with the Z-axis, one needs to define an Az=0° reference angle. Here, azimuth angle Az is set at zero in the orientations shown in FIGS. 3A-B.

After rotation by azimuth angle Az, angle of incidence $\theta_i$ is reduced to zero ($\theta_i=0$). At zero angle of incidence $\theta_i$, ray 118 is collinear with center axis 120 or, equivalently, with surface normal n̂. Thus, photon 110' of solar radiation 110 enters tube 114 through opening 116 along center axis 120. It does not undergo any reflections from inner surface of tube 114 and thus suffers no absorption. In other words, in the on-sun condition ($\theta_i=0$) all solar radiation 110 entering tube 114 reaches distal end 148. This produces a maximum in intensity of solar radiation 110 at distal end of tube 114.

Both elevation and azimuth angles El, Az have to be varied with time to stay on-sun or to maintain angle of incidence $\theta_i$ at zero. That is because sun 106 moves along trajectory 104 that varies in both elevation and azimuth. Large-scale prior art solar systems with large solar surfaces tend to track and stay on-sun as much as possible in order to maintain high efficiency. Still other systems adjust their orientation to on-sun every few minutes.

According to the present invention, a much longer time is permitted between updates of the orientation of solar surface 124 to on-sun. In fact, the determination of on-sun orientation of tube 114 is only performed periodically with approximately 40-minute intervals in-between. Knowledge of on-sun orientation is only used once about every 40 minutes to update the orientation of solar surface 124.

The determination of on-sun orientation of tube 114 and the measurement of intensity of solar radiation 110 at its distal end 148 will be explained in reference to FIG. 4. This figure contains a diagram in which tube 114 is shown in cross-section. Solar radiation 110A', 110B', 110C' is shown entering tube 114 through opening 116 at various angles of incidence $\theta_i$.

In FIG. 4 shielding tube 114 is shown in more detail with outer wall 152 and absorptive inner surface 154. In embodiments where tube 114 is made of metal such as stainless steel, inner surface 154 is rendered absorptive by providing it with a gray matte finish. In other embodiments, inner surface 154 can be a layer of material that absorbs electromagnetic radiation over as large a portion of bandwidth $\Delta\lambda_{amb}$ spanned by solar radiation 110 as required given the type of solar surface 124 and implementation of system 100. For example, when working with photovoltaic systems, only absorption in the red to infrared frequencies is important.

An optic 156 is positioned at distal end 148 of shielding tube 114. Optic 156 is designed for coupling solar radiation 110 that reaches distal end 148 of tube 114 into an optical waveguide or light guide 158. Light guide 158 is preferably a multi-mode optical fiber. Fiber 158 is attached at distal end 148 of tube 114 in any suitable manner. For example, it can be inserted and attached in place with the aid of an opaque water-tight cement.

Optic 156 focuses solar radiation 110 over the requisite range of bandwidth $\Delta\lambda_{amb}$ into the acceptance cone of light guide 158. For example, in photovoltaic applications optic 156 is optimized for red and infrared wavelengths. In general, optic 156 can be a refractive lens or another suitable type of optic such as a Fresnel element, a diffusive element, a catadioptric (refractive and reflective) element.

Light guide 158 is connected to a docking station or port 160. Port 160 is designed such that one or more photodetectors 162 can be temporarily connected to it for receiving solar radiation 110 collected by light guide 158. Since photodetector(s) 162 are connected only periodically, i.e., approximately every 40 minutes, provisions are made to cover up port 160 when photodetector(s) 162 are not connected thereto.

After receiving solar radiation 110 through light guide 158, photodetector(s) 162 generate a signal 164 that is related to the intensity of solar radiation 110 at distal end 148 of tube 114. In one embodiment, signal 164 is proportional to the total intensity of solar radiation 110 over bandwidth $\Delta\lambda_{amb}$ delivered from distal end 148 to port 160 by optical guide 158. Alternatively, signal 164 can be related to the presence of certain portions of the spectrum. For example in photovoltaic applications signal 164 can be based on red and infrared wavelengths only.

A processing unit 166 is in communication with photodetector(s) 162. The communication between unit 166 and photodetector(s) can be provided by a direct (wired) connection when unit 166 and photodetector(s) 162 are housed together. Any suitable wireless technology can be deployed when they are remote from each other. Processing unit 166 has appropriate resources for receiving from photodetector(s) 162 signal 164 and processing it to determine on-sun orientation of tube 114.

A single signal 164 from one or more photodetectors 162 is not sufficient for processing unit 166 to be able to determine on-sun orientation of tube 114. More data is required. For that reason, scan unit 126 is set up to periodically, e.g., every 40 minutes or so, execute a certain scan pattern in elevation angle El and in azimuth angle Az of tube 114. Scan unit 126 has a connection with processing unit 166 such that they can synchronize their operation.

In a preferred embodiment, processing unit 166 ensures that while scan unit 126 is executing the scan in angles El and Az, photodetector(s) 162 are properly connected to light guide 158 via port 160. Further, unit 166 can also monitor the quality of signal 164 at that time. Signal 164 must be sufficient for processing unit 166 to obtain a graph of the intensity of solar radiation 110 at distal end 148 of tube 114 during the scan.

FIG. 5 illustrates a graph 168 of the intensity of solar radiation 110 obtained during a scan in which tube 114 traverses the on-sun orientation. The scan is in one angle, namely elevation angle El. We note that during this scan, the angle of incidence $\theta_i$ of solar radiation 110 with respect to center axis 120 of tube 114 varies as shown in FIG. 4.

At the beginning of the scan, solar radiation 110C' is incident at a large angle ($\theta_i=\theta_{lg}$). In this range of angles most of solar radiation 110C' is absorbed due to multiple reflections off absorptive inner surface 154. Under these conditions, i.e., over the range $\theta_i=\theta_{lg}$, graph 168 in FIG. 5 indicates a linear dependence of intensity on angle of incidence $\theta_i$.

As the scan progresses in elevation angle El and angle of incidence $\theta_i$ decreases, graph 168 enters a non-linear regime. In particular, by the time angle of incidence $\theta_i$ is small ($\theta_i=\theta_{sm}$) as shown in FIG. 4, most solar radiation 110B' experiences only a single reflection off absorptive inner surface 154. Thus, a large portion of radiation 110B' reaches distal end 148 of tube 114. Correspondingly, graph 168 in FIG. 5 exhibits a local maximum in the range $\theta_i=\theta_{sm}$ where the single reflection condition holds.

Finally, as the scan in elevation angle El continues, angle of incidence $\theta_i$ goes to zero. At this point, solar radiation 110A' propagates through tube 114 without any reflections off absorptive inner surface 154. Thus, solar radiation 110A' reaches distal end 148 of tube 114 and produces a global maximum in intensity, as shown by graph 168 in FIG. 5.

In analyzing signal 164 it is important to correctly recover graph 168. In particular, it is important that processing unit 166 differentiate any local maximum, such as the one in the incident angle range $\theta_i=\theta_{sm}$ from the global maximum at $\theta_i=0$. It is the latter than indicates the on-sun orientation which needs to be used in updating the orientation of solar surface 124 by elevation drive 128.

The situation is more complicated in that a scan in elevation angle El alone is not guaranteed to get to the on-sun orientation where $\theta_i=0$. Therefore, scan unit 126 has to apply a scan pattern that scans in both elevation and azimuth angles El, Az using both drives 128, 130.

As shown in the pictorial or illustrative graph of FIG. 6, a scan pattern 170 is preferably executed over multiple updates in elevation angle El and in azimuth angle Az in succession. In other words, the scans are performed sequentially. The graph of FIG. 6 depicts this based on sun's 106 redrawn trajectory 104' expressed in terms of azimuth and elevation angles Az, El. Unlike the previous rotation convention, in FIG. 6 pointing at horizon 108 (see FIG. 2) corresponds to El=0° and pointing at sunrise position (see FIG. 2) corresponds to Az=0°. Also, positive changes in angle are clockwise. Crosses 172A, 172B, 172C, . . . indicate holding positions or rather orientations of panel 124, where scan unit 126 holds a constant orientation for a relatively long period of time. These holding positions 172A, 172B, 172C, . . . are updated periodically, e.g., about every 40 minutes.

FIGS. 7A-B are graphs of alternative scan sequences. In FIG. 7A we start with scanning in elevation angle El first. In FIG. 7B we start with azimuth angle Az scan first. We employ a succession of both scan patterns 170A, 170B shown in FIG. 7A and FIG. 7B since we can precisely calibrate Az, but not El during the 170A scan, and vice versa for 170B.

We start with an off-sun orientation for a given time of day that was set by drives 128, 130 at azimuth and elevation angles Az, El corresponding to orientation 172A, while sun 106 has moved to position 174A. Scan unit 126 now needs to execute scan pattern 170A shown in FIG. 7A to find the on-sun orientation with the aid of tube 114.

In a relatively short period of time, approximately 5 to 40 seconds, solar surface 124 sweeps from position 172A to position 172B powered by scan unit 126. Once in position 172B, surface 124 is again held stationary for approximately 40 minutes. After the 40 minutes have elapsed, sun 106 will have moved to position 174B. At this point, surface 124 is beginning to get far enough off-sun to lose power. The periodic scan 170 is now repeated by unit 126. This time, however, scan pattern 170B shown in FIG. 7B is used to move surface 124 from position 172B to 172C. Note that the next periodic scan will revert to scan sequence in FIG. 7A.

Surface 124 is intentionally updated so as to overshoot the on-sun position, because power is maintained at sufficient levels as long as the magnitude of incidence angle $\theta_i$ is within a range determined by the nature of surface 124. For example, photovoltaic panels require $\theta_i < 5°$, for 99.5% power output. By overshooting, $\theta_i$ is set to start at 5°. Then, $\theta_i$ decreases to 0° after 20 minutes as sun 106 continues on trajectory 104' and surface 124 ends up on-sun. Then, $\theta_i$ increases back to 5° another 20 minutes later. At this point, 40 minutes have elapsed, and under the direction of processing unit 166 scan unit 126 performs its next periodic scan pattern and updates the position of surface 124 by overshooting in the same manner. Based on this approach, a perfectly calibrated system 100 would find sun's position 174A to be perfectly centered between positions 172A and 172B.

We now look more closely at the portions of scan pattern 170. First, as indicated by the dashed line, scan unit 126 scans in elevation angle El. Referring back to FIG. 4, we see that this will result in decreasing intensity of solar radiation 110 at distal end 148 of tube 114. In other words, scanning by increasing elevation angle El will take tube 114 progressively more and more off-sun. Being connected to distal end 148 by light guide 158 during the scan, photodetector(s) 162 register this decrease and sends the correspondingly lower signal 164 to processing unit 166.

Processing unit 166, in turn, determines that the scan in elevation angle El is yielding intensities that correspond to more and more off-sun regions of graph 168 (see FIG. 5). In other words, unit 166 registers the change in intensity move from the small angle regime $\theta_i = \theta_{sm}$ with a local maximum to the linear large angle regime $\theta_i = \theta_{lg}$. Once unit 166 ascertains that scan in El is indeed moving progressively off-sun, it indicates to scan unit 126 to terminate the scan in El and turn off drive 128.

Now, according to scan pattern 170, processing unit 166 instructs scan unit 126 to turn on drive 130 and scan in azimuth angle Az. This portion of scan pattern 170 is in positive Az (angle Az is increasing) and is indicated in a dashed-and-dotted line. Scanning in Az results in increasing intensity of solar radiation 110 at distal end 148 of tube 114. In other words, scanning by increasing azimuth angle Az will take tube 114 more on-sun. At the intersection with trajectory 104' marked by point 174A, tube 114 will be on-sun.

After passing on-sun point 174A, further scanning in Az will move tube 114 progressively off-sun. As in the case of the scan in El, processing unit 166 tracks the orientation of tube 114 from off-sun, to on-sun and again off-sun by looking at curve 168. Unit 166 notes the on-sun point 174A. After it has been crossed and further scanning in Az is moving progressively further off-sun, unit 166 instructs scan unit 126 to terminate the scan in Az and turn off drive 130.

Determination of the on-sun point 174A for processing unit 166 involves confirming the global maximum at $\theta_i = 0$ (see FIG. 5). This can be done by finding the local and global maxima on graph 168. However, looking for maxima in graph 168 in practice is error-prone. This is especially true during changing atmospheric conditions. Thus, a different method is deployed in the present invention.

In particular, processing unit 166 determines on-sun orientation of tube 114 based on a convolution of signal 164 that generates graph 168 with an appropriately trained convolution kernel. In this method, graph 168 represents the function f(t) and the trained convolution kernel represent the function g($\tau$), with the convolution operation being defined as f(t)*g(t). Preferably, convolution kernel g($\tau$) is trained for each particular tube 114. That is because g($\tau$) will depend on many tube parameters, such as its length, absorption characteristics of absorptive inner surface 154 and other factors.

The training of kernel g($\tau$) for tube 114 occurs in system 100. However, it is done prior to its actual deployment for updating the orientation of solar surface 124. Preferably, the initial kernel g($\tau$) on which training starts is a square function. That is because convolution with a square function renders the result very sensitive to drop-offs. These will differ greatly for the local and global maxima under all atmospheric conditions and are not sensitive to absolute values. Hence they will yield a more robust or reliable method of telling them a-part.

In practice, kernel g($\tau$) is trained from its original square function to the appropriate trained convolution kernel based on a number of trials. These should ideally be performed not just at different times during one day, but over the course of several days. In addition, re-training may be required as the seasons change.

It should be noted that another convolution technique can be used with two kernels. This first kernel, g1($\tau$) is the derivative of a Gaussian, and g2($\tau$)=-g1($\tau$). The maximum of each convolution will find the edges of the signal, which can be averaged to find the center. For additional information on convolution functions the reader is referred to the book entitled Digital Signal Processing: Principles, Algorithms and Applications, Proakis, et al., Prentice Hall, $4^{th}$ edition.

The on-sun orientation thus found can be used to update the orientation of solar surface 124. In this last step, processing unit 166 instructs scan unit 126 to complete scan pattern 170 by scanning once again in elevation angle El and overshoot the sun's position as already described above. Notice, that the same scan unit 126 and drives 128, 130 are used both to execute the scan according to the invention and to update the orientation of solar surface 124. Of course, the same method can be applied whether surface 124 is reflective or photovoltaic.

Other alternatives in which both elevation and azimuth angles El, Az are varied simultaneously can also be implemented. An example of such scan pattern 170' is illustrated in the graph of FIG. 8. The sun positions and surface 124 positions are indicated in the same manner as in FIG. 7 but all the references are primed to reflect that they are part of scan pattern 170' rather than 170.

FIG. 9 is a three dimensional isometric view showing in more detail the solar panel station and mobile robot shown in FIG. 2. In this case port 160 for docking interface 144 of mobile robot 142 is shown explicitly in solar panel station 125. Note that remote elements shown on the right hand side in FIG. 4 are all housed on-board mobile robot 142. Thus, one ore more photodetectors 162, and processing unit 166 are on-board robot 142 and therefore mobile.

Solar tracking system 100 takes into account the prevailing or ambient insolation conditions by using a meter 180. A communication link 182 between the meter and the processing unit 166 is provided in those cases for supplying the measure to processing unit 166. Link 182 is preferably wireless. Of course, it is also possible to house meter 180 on-board robot 142. Given a measure of prevailing insolation conditions, processing unit 166 is in a position to correct the trained convolution kernel g(τ) based on these ambient insolation conditions.

Also shown in more detail in FIG. 9 is light guide or fiber 158 that guides solar radiation 110 to port 160, such that docking interface 144B of robot 142 can engage with it. Note that fiber 158 should be shielded to prevent ambient illumination from entering it and altering the level of solar illumination carried to photodetector 162 from distal end 148 of tube 114.

One skilled in the art will recognize that while a preferred embodiment uses an absorptive shielding tube that is straight or rigid in its form, the teachings of the present invention readily extend to many alternative constructions and types of tubes. For example, the tube does not necessarily need to have an absorptive inner surface, nor does it have to be in rigid cylindrical form, within the scope of the invention. Indeed, the tube can be a flexible optical waveguide attached to the solar surface or surfaces, and with appropriate processing algorithm(s) employed by the processing unit, the desired on-sun orientation of the tube and the attached solar surface(s) can be achieved. Such algorithms may involve other operations beside convolution on the signal produced by the photodetector(s) or may use a different trained convolution kernel to achieve the on-sun orientation.

In view of the above teaching, a person skilled in the art will recognize that the apparatus and method of invention can be embodied in many different ways in addition to those described without departing from the spirit of the invention. Therefore, the scope of the invention should be judged in view of the appended claims and their legal equivalents.

We claim:

1. A solar tracking system comprising:
a tube for admitting solar radiation through an opening;
at least one photodetector for generating a signal related to an intensity of said solar radiation incident on a distal end of said tube;
a scan unit for periodically executing a predetermined scan pattern of said tube during a daily trajectory of the sun;
a processing unit in communication with said at least one photodetector for determining an on-sun orientation of said tube based on said predetermined scan pattern;
wherein the solar tracking system is configured to update an orientation of at least one solar surface based on the on-sun orientation to an updated position that overshoots the on-sun orientation along the trajectory of the sun and hold the updated position constant for an interval of time,
wherein the solar tracking system is configured to repeat updating of the orientation of the at least one solar surface periodically during the daily trajectory of the sun so as to maintain a magnitude of incidence angle within a predetermined range.

2. The solar tracking system of claim 1, wherein said solar surface is a photovoltaic solar surface for producing electricity from solar radiation incident on the surface.

3. The solar tracking system of claim 1, wherein said solar surface is used to produce thermal energy from solar radiation incident on the surface.

4. The solar tracking system of claim 1, wherein said tube is a shielding tube having an absorptive inner surface for absorbing said solar radiation incident on said inner surface.

5. The solar tracking system of claim 1, wherein said tube is attached to said at least one solar surface such that a surface normal to said solar surface is parallel with a center axis of said tube.

6. A solar tracking system comprising:
a tube for admitting solar radiation through an opening;
at least one photodetector for generating a signal related to an intensity of said solar radiation incident on a distal end of said tube;
a scan unit for periodically executing a predetermined scan pattern of said tube; and
a processing unit in communication with said at least one photodetector for determining an on-sun orientation of said tube based on said predetermined scan pattern;
wherein said on-sun orientation is deployed for updating the orientation of at least one solar surface, wherein said processing unit determines said on-sun orientation of said tube based on convolution of said signal obtained during said predetermined scan pattern with a trained convolution kernel.

7. The solar tracking system of claim 1, wherein said scan unit executes said predetermined scan pattern in an elevation angle El and in an azimuth angle Az of said tube.

8. The solar tracking system of claim 7, wherein said scan unit comprises an elevation drive for varying said elevation angle El and an azimuth drive for varying said azimuth angle Az.

9. The solar tracking system of claim 8, wherein said solar tracking system further comprises a support structure for said at least one solar surface, and wherein said elevation drive and said azimuth drive are integrated with said support structure for updating the orientation of said at least one solar surface.

10. The solar tracking system of claim 1, further comprising a light guide for guiding said solar radiation from said distal end to said at least one photodetector.

11. A solar tracking system comprising:
a tube for admitting solar radiation through an opening;
at least one photodetector for generating a signal related to an intensity of said solar radiation incident on a distal end of said tube;
a scan unit for periodically executing a predetermined scan pattern of said tube;
a processing unit in communication with said at least one photodetector for determining an on-sun orientation of said tube based on said predetermined scan pattern, wherein said on-sun orientation is deployed for updating the orientation of at least one solar surface;
a light guide for guiding said solar radiation from said distal end to said at least one photodetector; and
a mobile robot housing said at least one photodetector on-board and capable of establishing a temporary connection with said light guide.

12. The solar tracking system of claim 11, wherein said mobile robot further houses said processing unit and a means of interfacing with said scan unit.

13. The solar tracking system of claim 10, further comprising an optic at said distal end of said tube for coupling in said solar radiation into said light guide.

14. A solar tracking system comprising:
a tube for admitting solar radiation through an opening;
at least one photodetector for generating a signal related to an intensity of said solar radiation incident on a distal end of said tube;
a scan unit for periodically executing a predetermined scan pattern of said tube;

a processing unit in communication with said at least one photodetector for determining an on-sun orientation of said tube based on said predetermined scan pattern, wherein said on-sun orientation is deployed for updating the orientation of at least one solar surface;
a light guide for guiding said solar radiation from said distal end to said at least one photodetector;
a meter for obtaining a measure of ambient insolation conditions; and
a communication link between said meter and said processing unit for supplying to said processing unit said measure;
whereby said processing unit determines said on-sun orientation based on ambient insolation conditions.

15. A method for solar tracking comprising:
providing a shielding tube for admitting solar radiation thereinto;
providing an absorptive inner surface in said shielding tube for absorbing said solar radiation incident on said inner surface;
generating a signal related to an intensity of said solar radiation at a distal end of said shielding tube;
periodically executing a predetermined scan pattern of said shielding tube;
determining an on-sun orientation of said shielding tube with a processing unit based on said predetermined scan pattern;
updating the orientation of at least one solar surface based on said on-sun orientation to an updated position that overshoots the on-sun orientation along the trajectory of the sun and hold the updated position for an interval of time; and
periodically repeat updating the orientation of the at least one solar surface periodically during the daily trajectory of the sun so as to maintain a magnitude of incidence angle within a predetermined range.

16. The method of claim 15, wherein said step of periodically executing said predetermined scan pattern and updating the orientation of at least one solar surface is repeated at regular intervals of time being approximately 40 minutes or more.

17. The method of claim 15, further comprising transporting said solar radiation from said distal end of said shielding tube to a remote photodetector using a light guide.

18. A method for solar tracking comprising:
providing a shielding tube for admitting solar radiation thereinto;
providing an absorptive inner surface in said shielding tube for absorbing said solar radiation incident on said inner surface;
generating a signal related to an intensity of said solar radiation at a distal end of said shielding tube;
periodically executing a predetermined scan pattern of said shielding tube;
determining an on-sun orientation of said shielding tube with a processing unit based on said predetermined scan pattern;
updating the orientation of at least one solar surface based on said on-sun orientation;
transporting said solar radiation from said distal end of said shielding tube to a remote photodetector using a light guide;
housing said remote photodetector on-board a mobile robot;
periodically establishing a temporary connection between said light guide and said mobile robot; and
executing said predetermined scan pattern while said temporary connection is established.

19. The method of claim 15, wherein said predetermined scan pattern comprises executing a scan in an elevation angle El and a scan in an azimuth angle Az.

20. The method of claim 19, wherein said predetermined scan pattern in said elevation angle El and said predetermined scan pattern in said azimuth angle Az are executed sequentially.

21. The method of claim 20, wherein said scan in said elevation angle El is executed first.

22. The method of claim 20, wherein said scan in said azimuth angle Az is executed first.

* * * * *